Sept. 10, 1963
J. E. JENDRISAK
3,103,430
GLASS BENDING APPARATUS
Filed Aug. 6, 1958
6 Sheets-Sheet 1
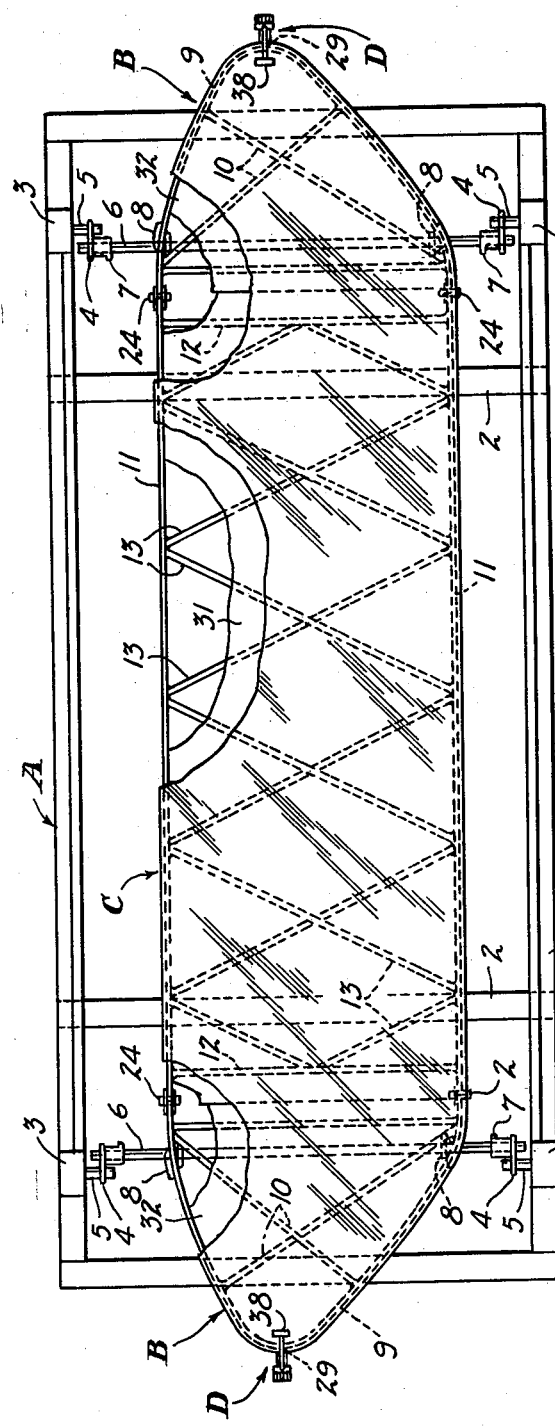
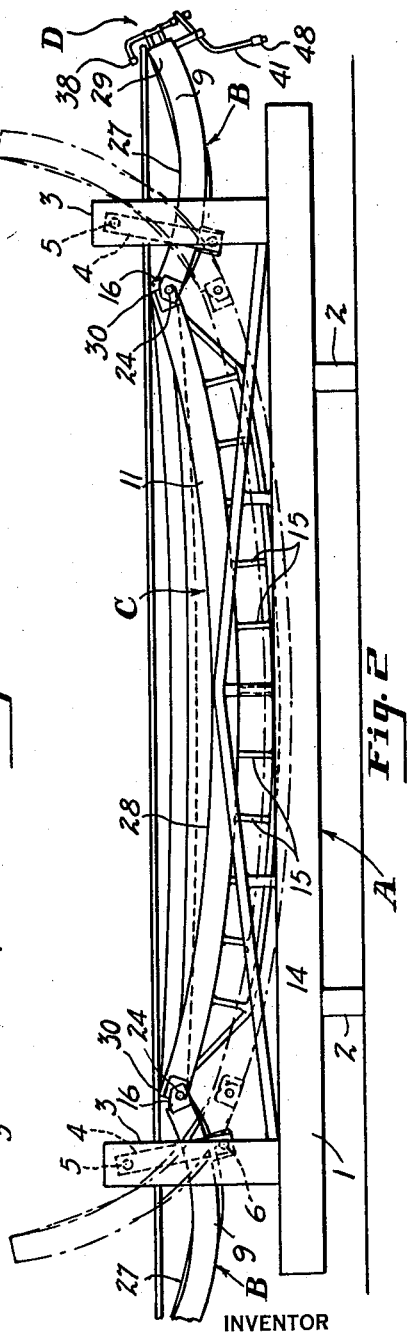
INVENTOR
Joseph E. Jendrisak
BY McCoy, Greene + te Grotenhuis
ATTORNEYS Sept. 10, 1963 J. E. JENDRISAK 3,103,430
GLASS BENDING APPARATUS
Filed Aug. 6, 1958 6 Sheets-Sheet 2
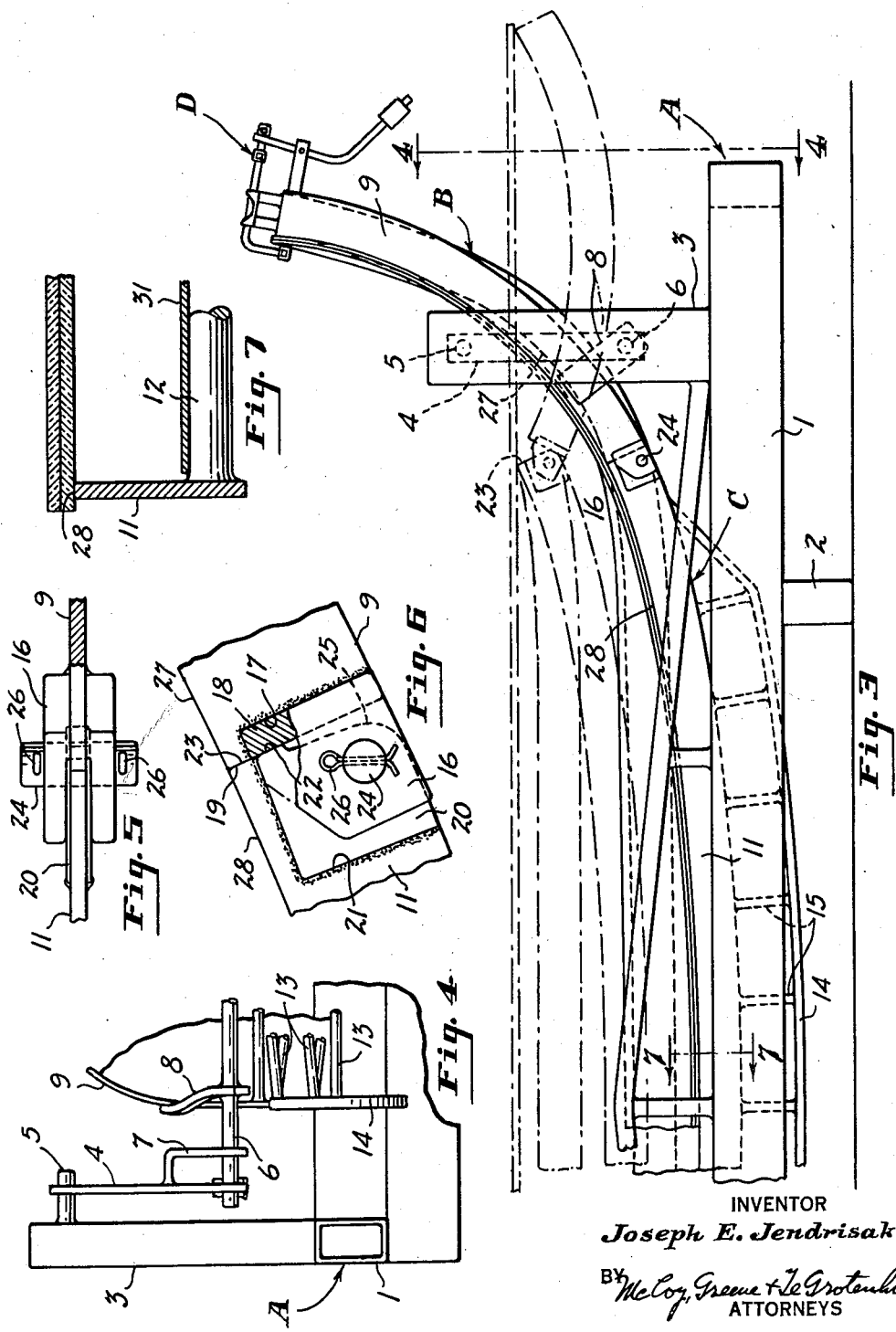
INVENTOR
Joseph E. Jendrisak
BY McCoy, Greene + TeGrotenhuis
ATTORNEYS

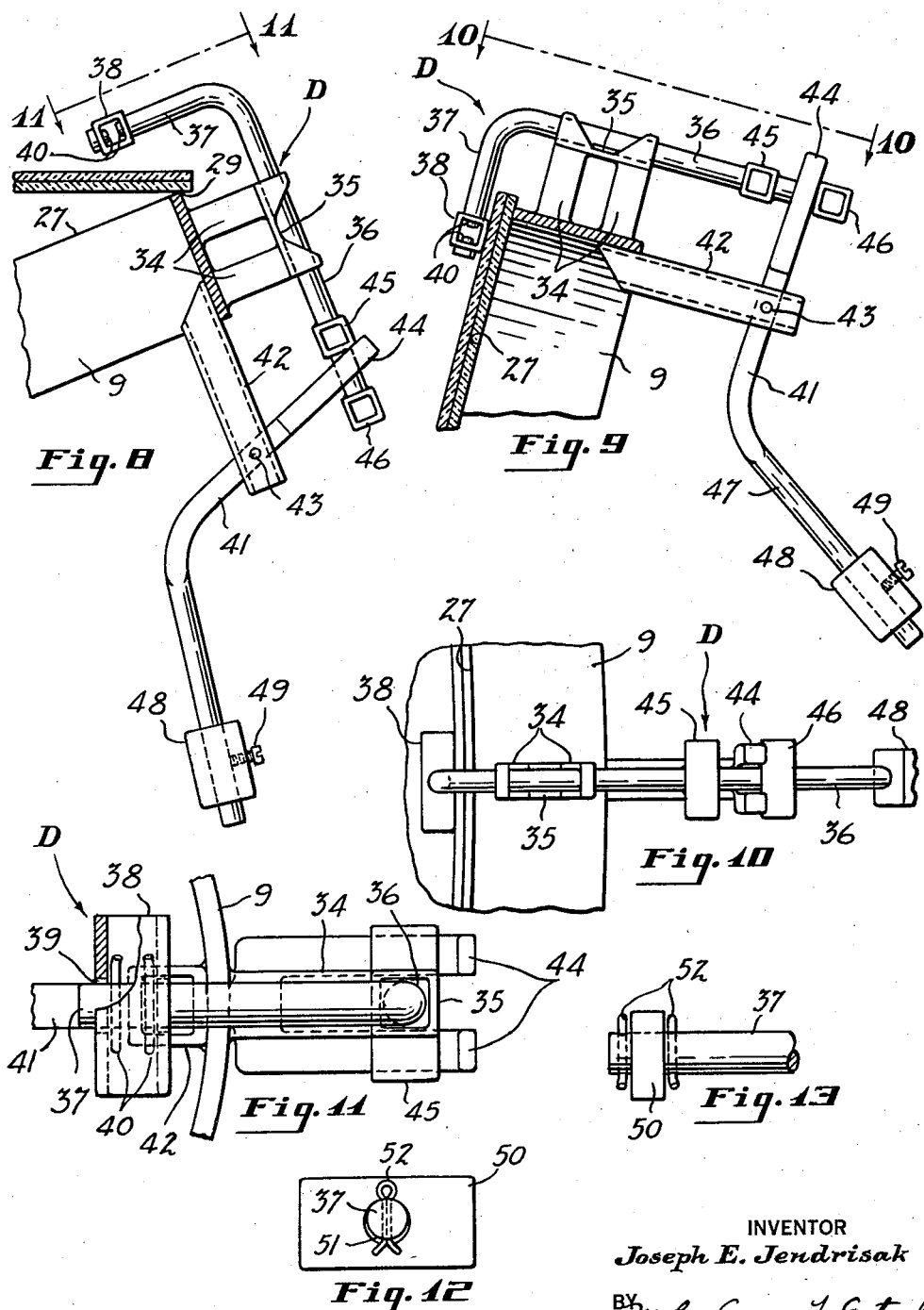

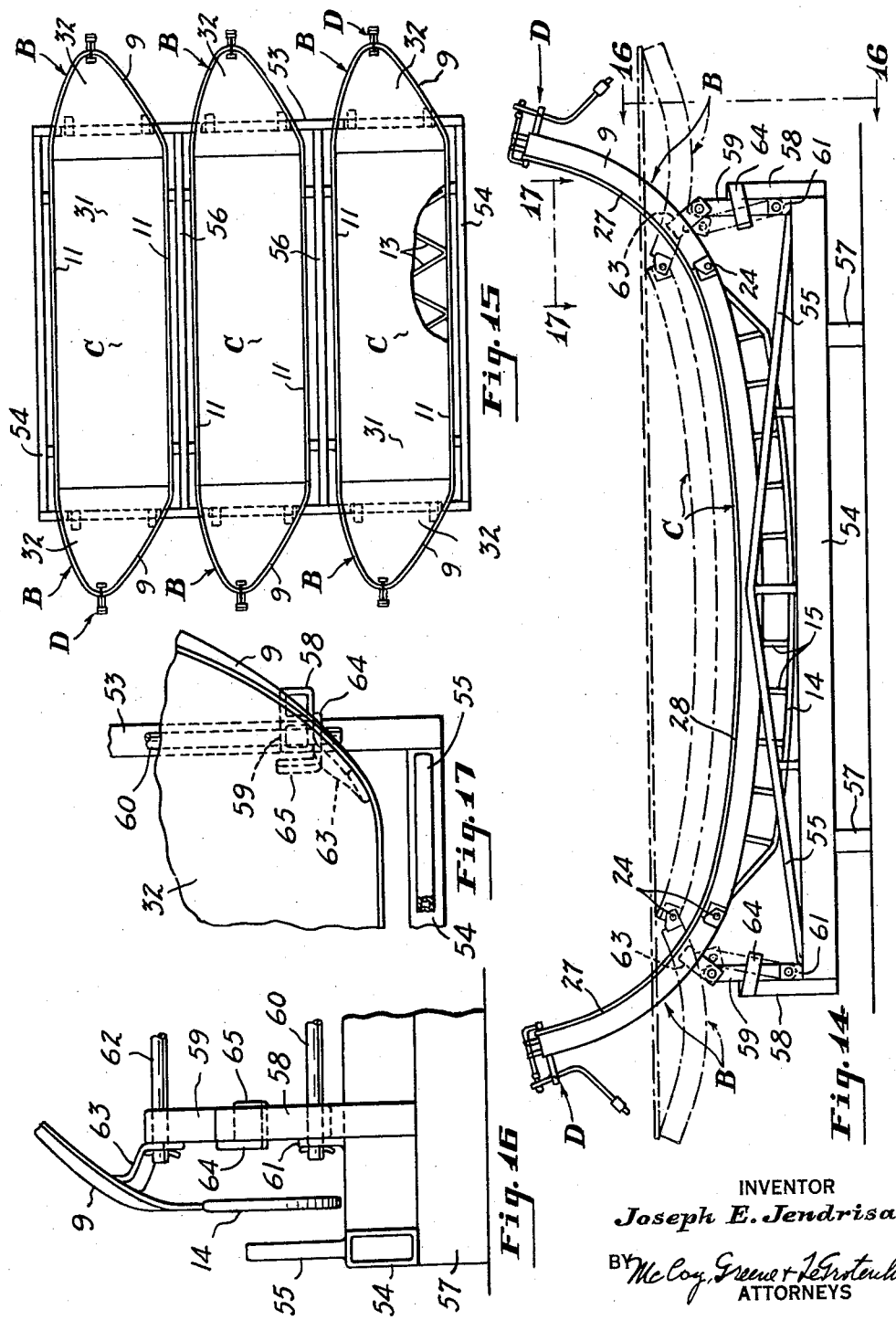

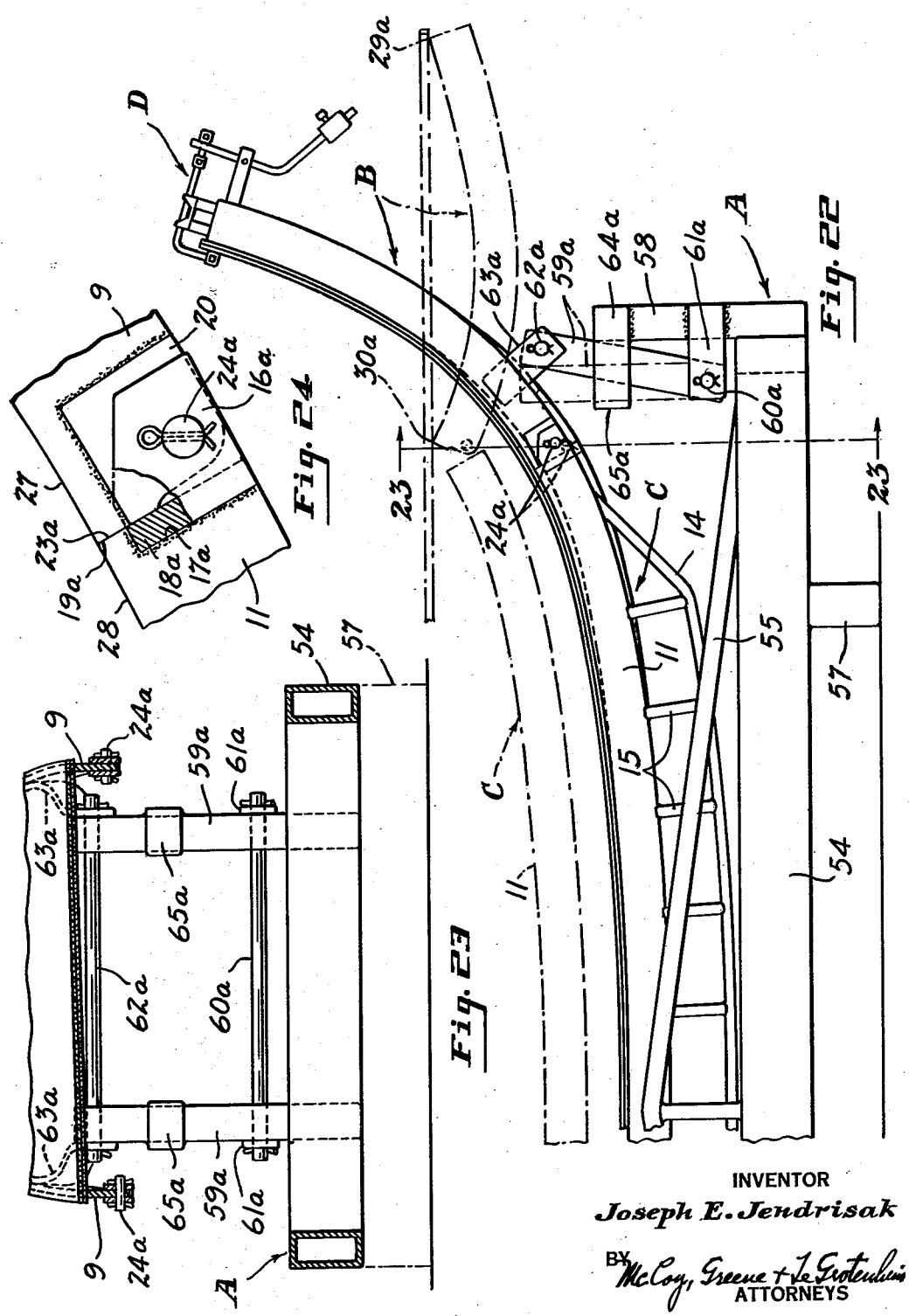

United States Patent Office 3,103,430
Patented Sept. 10, 1963

3,103,430
GLASS BENDING APPARATUS
Joseph E. Jendrisak, Northville, Mich., assignor to Shatterproof Glass Corporation, Detroit, Mich., a corporation of Michigan
Filed Aug. 6, 1958, Ser. No. 753,500
7 Claims. (Cl. 65—290)

This invention relates to the forming of curved glass panes such as used in windshields and rear automobile windows and more particularly to glass bending apparatus including a collapsible mold that is movable from a longitudinally extended position where it provides a support for a flat glass pane to a longitudinally contracted position where it provides a continuous concave shaping surface that conforms to the marginal portion of the convex face of the curved pane. The present application is a continuation-in-part of my copending application Serial No. 568,747, filed March 1, 1956, now abandoned.

Windshield and rear window glass for automobiles is shaped by heating the glass to its softening point and causing it to sag into contact with a form or mold that imparts the desired contour to the glass. The heating and gravity bending is accomplished by passing the molds with glass panes to be bent supported thereon through a lehr in which the glass panes are heated during their travel to a point where the glass is softened and caused by sag by gravity into the mold.

The problem with which the present invention is chiefly concerned is the bending of glass panes that have been cut to final shape before bending. This problem is a difficult one because contact of heat softened glass with positioning and shaping members during the bending operation causes surface blemishes and local distortion of the glass, and for this reason contact with such members must be confined to marginal portions of the glass panes. Unless such contact can be confined to a narrow space immediately adjacent the margin of the pane where any blemishes will be concealed by the glass retaining members of the automobile body, the flat pane must be sufficiently oversize to permit the marred marginal portions to be cut away after bending. Cutting glass panes to size after bending is a difficult operation and adds considerably to the cost of manufacture because of the additional cutting operation and because of the waste of glass.

The mold of the present invention is of the type having center and end sections connected in counterbalancing relation that are collapsible from an elevated and extended glass receiving position to a glass shaping or molding position where it provides a narrow continuous marginal shaping face that conforms to the marginal portion of the convex face of the curved pane and is so constructed that a flat rigid glass pane is supported by end and intermediate portions of the shaping face which engage the under side of the pane closely adjacent its ends and closely adjacent its opposite side edges that are moved downwardly while the end portions are simultaneously moved upwardly by the shifting of weight from the end points of support to the intermediate points when the glass softened by heat sags by gravity, the glass being supported solely by portions of the shaping face that engage with it closely adjacent its marginal edge during the bending operation, so that there are no mold marks that will be visible when the precut glass pane is mounted in the window opening.

Windshields are required to be made of laminated safety glass and it has been found to be necessary to bend the two panes of glass that are to receive the thin plastic sheet between them simultaneously by placing them in superposed relation over the mold and causing them to bend simultaneously in order to obtain the conformity required for the subsequent laminating operation.

If two superposed panes of windshield glass that have been precut to size before bending are to be simultaneously bent, the lower panes must be accurately guided into contact with the shaping faces of the mold and accurate registry of the two panes of glass must be maintained during the bending operation.

In the process of making laminated safety glass, the plastic sheet is placed between the glass panes and the assembly is subjected to a preliminary heating under pressure to provide a seal between the sheets of glass and the intermediate plastic sheet throughout the marginal edge of the assembly, after which the assembly is subjected to heat and pressure in an oil bath. Unless a fluid tight seal is provided throughout the marginal edge of the assembly, oil will penetrate into the space between the glass sheets and such penetration, known as "blowing" results in a defective product.

If the panes have been cut to size before bending, no positioning member can be permitted to engage the edges of the superposed glass panes during the bending operation, since such contact with the softened glass would cause distortion of the edges so engaged, making it impossible to obtain the necessary sealing contact between the glass and the plastic sheet throughout the marginal edge, and the shaping surface of the mold which engages the pane close to its marginal edge must be smooth and continuous.

The mold of the present invention, by maintaining the glass in engagement with portions of the shaping face throughout the bending operation, by simultaneously bending the opposite ends of the glass pane and by so constructing the mold that the end and intermediate supporting portions of the shaping face move to a glass supporting position in the same horizontal plane, maintains precut superposed glass panes in registry during the bending operation without the use of any holding members that would distort edge portions of the panes or create any irregularity in the marginal portions of the contacting faces of the panes.

Proper application of heat to the different portions of glass to control the sagging is of great importance particularly where panes of different sizes and shapes are being simultaneously heated in the lehr.

In the manufacture of replacement windshields and back windows for automobiles it is necessary to provide molds for a large number of panes of different sizes and shapes and only a limited number of each size are required. In the plant of applicant's assignee lehrs are employed which accommodate a large number of glass bending molds. One of these lehrs is of a length such that about one hundred and ninety molds may be within it at a given time, and it often happens that as many as thirty different windshield shapes may be passing through the lehr at the same time.

Because of the great variation in windshield shapes, it is impossible to provide the optimum temperature conditions in the lehr for all of the shapes being bent. It is, therefore, necessary to adjust the heaters and overhead shields to take care of the most difficult bends and to accommodate the other molds to such heat conditions. Compensation can be effected by varying the height at which the individual molds are supported on their frames and by varying the extent of the shields on the bases of the mold supporting frames. However, such adjustments will not adequately compensate for all sizes and shapes of glass being bent and, in order to provide better control of the heat in various portions of the glass panes, molds embodying the present invention are provided with heat shielding plates and heat absorbing plates that are mounted directly in the sections of the collapsible mold. To limit the transverse sagging of the central portion of the bottom pane, heat shielding plates may be mounted in the center and end sections a short distance below the level of the marginal glass engaging faces which retard the heating of the bottom pane so that the under surface of the top pane will have full contact with the top surface of the bottom pane. In the bending of wrap around window panes that have a deep bend and that taper to a point at their ends, the end portions tend to curl away from the shaping surface at the ends of the mold due to more rapid heating. To offset this tendency, relatively thick heat absorbing plates may be mounted in the tips of the end sections of the mold slightly below the level of the shaping faces.

To insure the proper engagement of the pointed ends of the superposed panes with one another and with the ends of the mold, a hold down device is provided at each end of the mold which is held out of contact with the flat glass during the major portion of the movement of the mold from the glass receiving position to the molding position but which is actuated to press lightly against the top face of the top pane at its end as the mold approaches the molding position.

During their passage through the lehr the glass bending molds are positioned side by side and crosswise of a conveyor that travels longitudinally through the lehr and the rate of production of bent glass is proportioned to the number of molds that can be accommodated within the lehr at a given time. In accordance with the preferred construction the mold of the present invention is supported upon a rigid carrying frame which has no parts projecting above the glass engaging portions of the mold by means of supporting members that are movably connected to the end sections of the mold and to the frame and located beneath the mold, thereby making it more convenient to place the glass to be bent on the molds, facilitating control of the heat applied to the glass and making possible a close spacing of the molds on the conveyor.

The main object of the present invention is to provide means for simultaneously bending panes of glass that have been precut to size and particularly superposed precut panes in such manner that no surface distortions or irregularities are produced in the marginal portions of the contacting faces of the molded panes.

A further object is to provide a collapsible deep bend mold having improved means for controlling the application of heat to a glass pane supported on the mold.

An additional object is to provide means for holding narrow end portions of glass panes against the shaping surface during the final portion of the bending operation.

A further important object of the invention is to provide a collapsible mold constructed to permit close spacing of the molds on the conveyor that carries them through the lehr, so that a maximum number of molds may be accommodated in the lehr and the rate of production correspondingly increased.

Reference should be had to the accompanying drawings forming a part of this specification, in which:

FIGURE 1 is a top plan view of a molding apparatus embodying the invention;

FIG. 2 is a side elevation of the apparatus shown in FIG. 1;

FIG. 3 is a fragmentary side elevation of one end of the mold on an enlarged scale;

FIG. 4 is a fragmentary elevation viewed as indicated at 4—4 in FIG. 3;

FIG. 5 is a fragmentary top plan view of one of the hinge connections between the center section and an end section of the mold;

FIG. 6 is a fragmentary side elevation of the hinge connection shown in FIG. 5;

FIG. 7 is a fragmentary vertical section taken on the line indicated at 7—7 in FIG. 3;

FIG. 8 is a fragmentary side elevation showing the glass holding device that is mounted on the outer end of each end section of the mold, showing the position of the molding device when a flat glass pane is supported on the mold;

FIG. 9 is a fragmentary side elevation of the holding device showing its position when the end section is in molding position;

FIG. 10 is a plan view of the holding device in molding position, viewed as indicated at 10—10 in FIG. 9;

FIG. 11 is a plan view of the holding device viewed as indicated as 11—11 in FIG. 8;

FIGS. 12 and 13 show a modified form of a glass engaging block in end and side elevation respectively;

FIG. 14 is a side elevation of a glass bending mold provided with a modified form of support;

FIG. 15 is a top plan view showing a plurality of molds in glass receiving position mounted side by side on the supporting frame in closely spaced relation;

FIG. 16 is a fragmentary end elevation viewed as indicated at 16—16 in FIG. 14;

FIG. 17 is a fragmentary plan view, viewed as indicated at 17—17 in FIG. 14;

FIG. 22 is a fragmentary side elevation showing a modified form of mold;

FIG. 23 is a vertical transverse section taken on the line indicated at 23—23 in FIG. 22; and FIG. 24 is a fragmentary side elevation showing the hinge connection between the center and end section on an enlarged scale.

Figure 18:
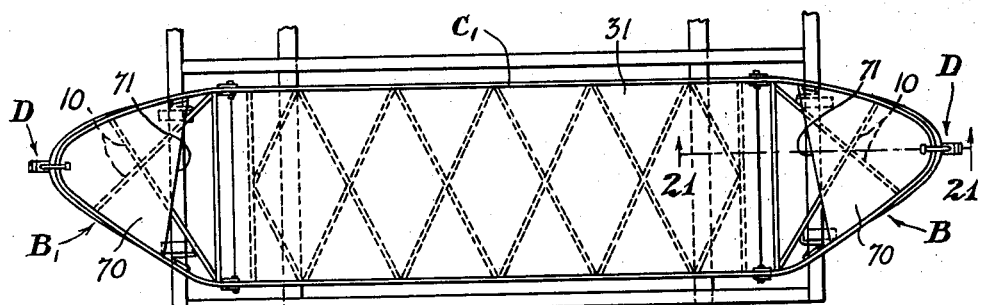
FIG. 18 is a plan view of a mold having modified structure for controlling the application of heat to the glass.

As shown in the accompanying drawings, the glass forming apparatus of the present invention comprises a supporting frame A and a glass forming mold composed of two substantially identical end sections B that are rockably supported on the frame A, a center section C that is interposed between the end sections B and pivotally supported on the inner ends of the sections B, and a glass hold down device D at the outer end of each end section.

As shown in FIGS. 1, 2 and 3, the frame A comprises a rectangular base 1 mounted on runners 2 which serve to support the frame on a conveyor such as a bed of live rollers for advancing the molds through a heating oven. Adjacent the ends thereof the frame is provided with longitudinally alined pairs of laterally spaced mold supporting posts 3 to which the upper ends of mold supporting links 4 are connected by axially alined horizontal pivots 5. A transverse horizontally disposed shaft 6 is journaled in the lower ends of the links 4 and in bearing straps 7 rigidly attached to the links 4 and having shaft receiving portions spaced inwardly from the links 4. The shafts 6 provide longitudinally movable rocking supports or fulcrums for the end sections 3 of the mold, the mold sections B having downwardly projecting brackets 8 that are attached to the shaft 6, the brackets 8 being located intermediate the ends of the end sections B and more closely adjacent the inner end of the sections than the outer ends. The base 1, runners 2 and posts 3 are preferably tubular metal members which have adequate structural strength but are of light weight and low heat absorbing capacity.

The end sections B of the mold are formed by thin steel strips 9 disposed on edge and forming the margin of the mold section, the strips being reinforced by cross members 10 that connect the side portions of the strip below the top edge thereof. The glass engaging strips 9 are of light weight so that they do not materially retard the cooling of the glass after the bending operation and are preferably imperforate so that transfer of heat between the glass and the strips 9 is uniform at all points of contact.

The center section is formed by thin steel side strips 11 that are disposed on edge and that are connected adjacent their ends by cross members 12 at right angles thereto intermediate their ends by crossing diagonal cross members 13. When the center section is of considerable length it is desirable to stiffen the side strips 11 by making each of them the compression chord of a truss having a tension chord 14 connected at its ends to the strips 11 adjacent the ends thereof and connected at intervals to the lower edge of the strips 11 by means of braces 15.

It is desirable that the mold be of light weight and of low heat absorbing capacity and, in order to provide maximum rigidity with minimum weight, the bracing members 10, 12, 13, 14 and 15 are preferably in the form of relatively thin-walled metal tubes. It has been found advantageous to form the truss members 14 and 15 of a metal having a lower coefficient of expansion than the steel strips 11, as disclosed and claimed in my copending application Serial No. 486,562, filed February 7, 1955, upon which Patent No. 2,872,756 was granted February 10, 1959.

Each of the end sections B is connected to the center section C by two identical hinge connections between the ends of the marginal strip 9 of section B and the side strips 11 of the center section C. As best shown in FIG. 6, each of these hinge connections includes a U-shaped hinge member 16 secured in a recess 17 in an end of the strip 9 with its bottom 18 engaging the end face of the strip 9 at the bottom of the recess 17 and with the inner face of the bottom 18 flush with the end face 19 of the strip 9 above the recess 17. A rectangular plate 20 slightly thicker than the strip 11 is secured by welding in a recess 21 in the adjoining end of the strip 11 and the plate 20 is received between the arms of the hinge member 16, being provided with an end face 22 adjacent its outer edge that engages with the inner face of the bottom 18 of the hinge member 16 to limit the pivotal movement of the end sections B with respect to the center section C.

The strip 11 has an end face 23 above the recess 21 that is flush with the end face 22 of the plate 20 which engages with the end face 19 of the strip 9 when the center section is in its lowermost position. A pivot pin 24 extends through openings in the arms of the hinge member 16 and the plate 20. The pivot pin 24 is offset inwardly with respect to the end faces 22 and 23 of the center section and below the end face 22 of the plate 20 has a relieved portion 25 which permits the hinge member 16 and the end section to which it is attached to swing downwardly from the position shown in FIG. 6. The pivot pin 24 may be secured in place by suitable means such as cotter pins 26.

As shown in FIG. 6, the faces 19 and 23 at the parting line between the top faces 27 and 28 of the strips 9 and 11 are in a plane substantially perpendicular to said top faces at the parting line and the pivot 24 is offset with respect to said plane so that the end edge of the top face 27 that is on the side of said plane opposite that upon which the pivot is located swings downwardly with respect to the abutting end edge when the center section is moved upwardly from the molding position and remains clear of the glass during the return of the mold sections to molding position.

The pivot may be offset inwardly with respect to the parting line as shown in FIGS. 3 and 6 to maintain the inner ends of the top faces 27 below the outer ends of the faces 28 during movement of the sections from the glass receiving position to the molding position or the pivot may be offset outwardly with respect to the parting line as shown in FIGS. 22 and 24 to maintain the outer ends of the faces 28 below the inner ends of the faces 27 during such movement.

The top faces 27 and 28 form a smooth continuous concave molding surface that conforms to the marginal portion of the convex face of a curved glass pane when the mold sections are in molding position as shown in dotted lines in FIG. 2 and in full lines in FIG. 3, the concave faces 27 and 28 being flush with one another at each of the joints when the sections are in molding position as shown in FIGS. 3 and 6.

As shown in FIG. 2, the mold sections are adapted to be positioned to support a flat pane of glass cut to final form, the glass pane being supported at its ends upon the apices 29 of the faces 27 of the end sections B and on the ends 30 of the top faces 28 of the side strips 11 or the center section, the ends 30 being the high points of the concave top faces 28 and the apices 29 being the high points of the top faces 27 of the end sections.

The supporting members 4 are of equal length and are so positioned with respect to the sections B that they are in substantially vertical position when the mold sections are in molding position as shown in FIG. 3. The distances between the pivot shaft 6 and the pivots 24 being the same at each end of the mold and the pivots 24 at the opposite ends of each strip 11 being held against relative longitudinal movement, the lower ends of the supports 4 swing inwardly toward one another and out of parallelism as the end sections B are swung downwardly from their positions shown in dotted lines in FIG. 2 to the position shown in full lines. When a glass pane is placed on the mold sections with its ends engaging the apices 29 of the end sections B, the outer ends of the end sections B are swung downwardly and the center sections C moved upwardly until the four end portions 30 are brought into engagement with the under side of the glass pane, forming a stable support for the glass pane.

When a rigid pane is supported on the mold as shown in FIG. 2, the end sections 9 act as levers pivoting on the shafts 6 and exert an upward thrust on the center section to lift the same until its movement is arrested by engagement with the glass, after which the weight of the glass is carried by the inner and outer ends of the end sections B in proportions determined by the weight of the center section and the position of the shafts 6 with respect to the ends of the end sections.

The curvature of the top and bottom edges of a windshield or rear automobile window is usually different adjacent the ends thereof. This difference of curvature occurs mainly in the portion of the pane that is formed by the end sections B of the mold so that there need be but slight difference in the form of the top faces 28 of the strips 11 or in the height of the glass engaging end portions 30 of the strips 11. It is important however that the mold provide a level support for the glass panes prior to bending and this result is accomplished by making the lengths of the brackets 8 such that the glass engaging points 29 and 30 are in the same horizontal plane when the mold is in its glass receiving position as shown in FIG. 2.

When the glass pane is subjected to heat it gradually loses its rigidity and the weight imposed on the inner ends of the end sections B is increased, so that the upward thrust of the end section B on the ends of the glass pane is increased and the end sections B rock on the shafts 6 as the glass gradually sags between the ends thereof, moving the inner ends of the section B and the central section C downwardly and the outer ends of the sections C upwardly toward the molding position.

The four intermediate supporting portions 30 of the shaping surface provide a stable support for a glass pane, holding it against shifting movements laterally or longitudinally during the sagging movement. The position of the pivot pins 24 with respect to the movement limiting end faces of the strips 9 and 11 maintains the end portions 30 of the center section above the adjacent ends of the strips 9 throughout the downward movement of the center section, so that the glass comes into engagement with the inner ends of the section B only when the section C has reached its lowermost position as shown in FIG. 3.

The location of the pivots 24 below the top faces 27 and 28 of the strips 9 and 10 causes the space between the glass engaging portions 30 of the center section and the glass engaging apices 29 to lengthen when the end section is moved to glass receiving position and to shorten as the end section returns to molding position, thereby compensating for the sagging of the glass pane between the supports 29 and 30 during the bending operation, so that the sliding of the glass pane on the apices 29 of the end sections during the bending operation is very slight.

Because of the fact that the links 4 supporting the end sections B are swung inwardly to downwardly converging positions when the mold sections are in glass receiving position, the end sections are constrained to move angularly at equal rates during the sagging of the glass since any inequality of such angular movements would move the mold endwise and would be resisted by the inertia of the loaded mold and the weight of the end portion thereof toward which the mold is shifted. The simultaneous and equal bending of the ends of the glass pane prevents longitudinal shifting of the glass with respect to the mold during bending and the horizontal alinement of the intermediate glass engaging portions of the shaping face during the initial portion of the sagging movement of the glass enables said engaging portions to hold the glass against lateral slippage.

Since automobile window glass is of the sandwich safety type in which a layer of transparent plastic is interposed between sheets of glass, it is desirable that the glass panes be bent in pairs, one pane on top of the other, as shown in FIG. 3, so that the two panes of glass employed in forming a window will conform to one another. In order to insure perfect conformity of the superposed panes of glass, means is provided for maintaining the bottom pane at a somewhat lower temperature than the top pane during the bending operation. This may be accomplished by supporting a flat intercepting plate 31 of heat absorbing material such as a thin sheet of stainless steel on the reinforcing cross members 13 of the center section C, and a similar sheet 32 on the cross members 10 of the end sections B. The heat intercepting plates 31 and 32 are spaced a short distance below the molding faces 27 and 28 of the mold sections and closely underlie the lower glass pane throughout the bending operation, so that the temperature of the bottom pane is kept somewhat lower than that of the upper pane and transverse sagging of the bottom pane is prevented and full engagement of the top pane with the bottom pane at the end of the bending operation is insured. The thickness of the plates 31 and 32 is such as to provide the desired heat intercepting effect for the particular glass being molded.

Where the ends of the glass panes are bent to a curvature such that the end sections B extend upwardly at a steep angle when in molding position, there is little weight imposed on the apices 29 as the end sections approach their molding positions and the weight so imposed may be insufficient to hold the ends of the glass panes tightly against the strips 9 at the apices 29 of the mold. In order to insure accurate forming of the ends of the glass pane, the hold down devices D are provided for holding the ends of the glass pane against the mold section during the final portion of the bending operation. A hold down device D, such as shown in detail in FIGS. 8 to 11 of the drawings, is supported on a bracket attached to the strip 9 at the apex of each section, each bracket being composed of two tubular posts 34 attached to the strip 9 and an outer portion 35 connecting the posts 34. The posts 34 are perpendicular to the side face of the strip 9 and the connecting portion 35 is formed to provide a guide for a sliding rod 36 that extends substantially parallel to the outer face of the strip 9 and that has a down-turned inner end 37 that overlies the glass engaging face of the mold section B adjacent the apex 29. The down-turned portion 37 has a glass engaging block 38 attached thereto which may be a tubular metal block of rectangular cross section which has openings 39 in opposite walls to receive the down-turned portion 37 of the actuating rod. The block may be secured in place by suitable means such as cotter pins extending through the portion 37 of the actuating rod inside the hollow block. The rod receiving apertures 39 are preferably of a size to provide a slight clearance around the actuating rod so that the block may readily assume a position in which a flat face thereof is in full engagement with a glass pane. The rod 36 is actuated by means of a lever 41 that is connected to a tubular post 42 attached to the strip 9 and extending outwardly in a direction substantially parallel to the rod 36. The lever 41 is connected to the post 42 by a pivot 43 that extends at right angles to the rod 36 and the lever is provided with a fork 44 at its upper end that straddles the rod 36 between inner and outer spaced collars 45 and 46 attached to the rod 36.

Below the pivot 43 the lever 41 has an outwardly bent portion 47 on which is adjustably mounted a counterweight 48. The counterweight 48 is slidable on the lever and is secured in adjusted position by means of a set screw 49.

As shown in FIGS. 12 and 13, a solid glass engaging block 50 may be employed instead of the hollow metal glass engaging block 38. The block 50 is preferably formed of poor heat conducting material, capable of resisting the heat to which the glass is subjected in bending. The block 50 has an aperture 51 to receive the supporting rod and is secured in place on the rod by suitable means such as cotter pins 52. The block 50 is supported loosely on the rod so that it can readily accommodate itself to the glass surface.

When the section B of the mold is in glass receiving position as shown in FIG. 8, the counterweight 48 is disposed inwardly of the pivot 43 and the lever 41 exerts a pressure on the collar 45 which pushes the rod 36 inwardly to a position where the glass engaging block 38 is supported clear of the glass panes. When the section B of the mold is shifted upwardly to its molding position as shown in FIG. 9, the counterweight 48 is shifted to a position outwardly of the pivot 43 and the forked end 44 of the lever exerts pressure on the collar 46 to move the rod 36 outwardly and to press the glass engaging block 38 against the glass immediately adjacent the apex 29 of the mold section B. Pressure exerted on the ends of the glass panes by the hold down devices D at the time the mold sections B are brought to molding position insures proper engagement of the ends of the panes with the ends of the mold sections B and prevents separation of the superposed glass panes at the ends thereof.

In FIGS. 14 to 17 of the drawing a modified form of support for the glass bending mold is shown. The mold sections B and C may be identical with the mold sections heretofore described, but a somewhat different supporting structure is employed. As shown in FIGS. 14 to 17, a series of molds are supported upon a suitable frame having longitudinal side bars 53, and cross bars 54 which may be provided with truss-like braces 55 and intermediate cross bars 56, the frame being supported on longitudinal runners 57 which support the frame on the lehr conveyor. Short posts 58 are attached to the side bars 53 and these posts are arranged in pairs to support the adjacent molds on the frame. The frame parts 53 and 58 inclusive are preferably formed of tubular metal bars in order to reduce the weight and heat retaining capacity of the frame as much as possible. A supporting link 59 is attached to the frame at the inner side of each of the posts 58 and each of these supporting links is in the form of a tubular bar attached at its lower end to a horizontal shaft 60 journaled in bearing brackets 61 attached to the inner side of the post of each pair closely adjacent the top of the side bars 53.

The upper ends of the supporting members 59 receive a horizontal shaft 62 which is attached at its ends to brackets 63 rigidly secured to the strip 9 of an end section B of the mold which extend downwardly from the mold in substantially the same manner as the brackets 8 in the modification first described. The supporting links 59 are in engagement with the inner faces of the posts 58 when the mold sections are in molding position as shown in full lines in FIG. 14, and the links 59 swing inwardly as the center section is moved upwardly to the glass receiving position shown in dotted lines in FIG. 14.

Figure 19:
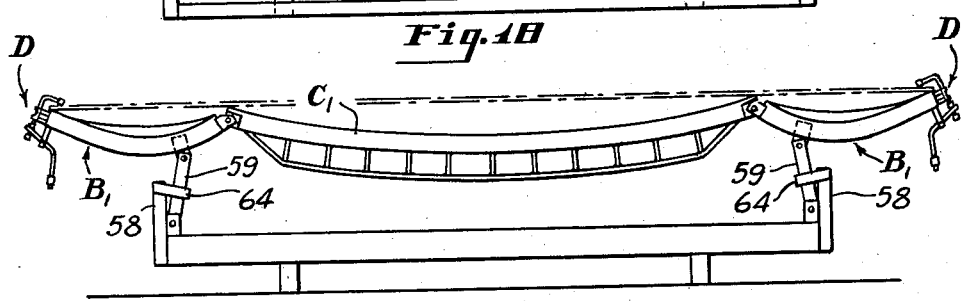
FIG. 19 is a side elevation of the mold shown in FIG. 18 showing the mold in glass receiving position.
Figure 20:
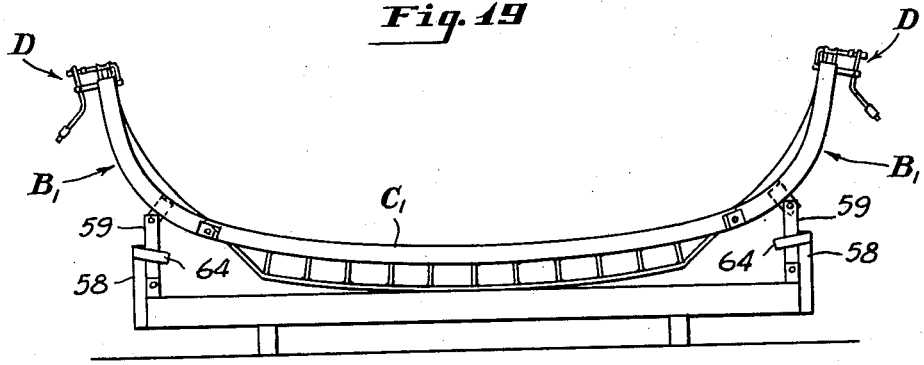
FIG. 20 is a side elevation of the mold showing the same in molding position.
Figure 21:
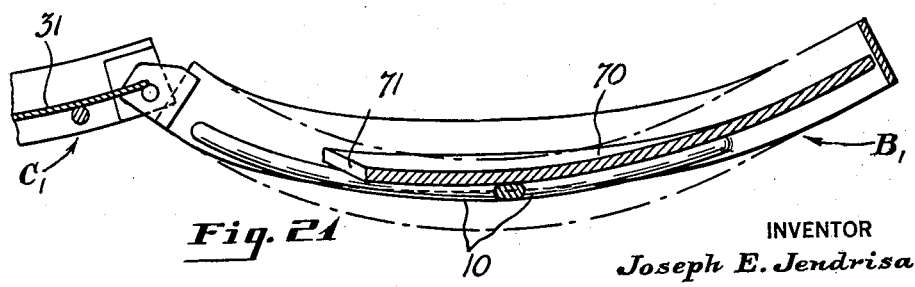
FIG. 21 is a section on an enlarged scale taken on the line indicated at 21—21 in FIG. 18.

When the mold is supported on suspended links such as the links 4 shown in FIGS. 1 to 3 of the drawing the weight of the mold and the glass resists endwise movement of the mold when the links 4 are vertical as shown in FIG. 3. However, when the mold is supported upon the ends of links pivoted at their lower ends such as the links 59 shown in FIGS. 14 to 21, the weight of the mold and glass favors such endwise movement when the links are vertical. The posts 58 permit the movement of the links 59 in one direction and straps 64 attached to the posts are provided with stop flanges 65 in the path of the links 59 to limit their movement in the opposite direction. The links engage the stop flanges 65 when the mold is in glass receiving position and with the posts 58 when the mold is in molding position. The engagement of the links 59 with the posts 58 serves to relieve the impact between the end faces of the supporting straps 9 and 11 when the mold sections reach the molding position and thereby reduces the wear and tear on the heated mold.

The posts 58 and supporting links 59 are disposed beneath and inwardly of the opposite sides of the mold, so that molds may be mounted side by side in closely spaced relation on the supporting frames and on the lehr conveyor.

For ordinary bends, weight distribution and the heat intercepting plates 32 of the end sections retard the sagging of the ends of the molds sufficiently to enable the mold sections to complete their movement to molding position before engagement of the glass with portions of the shaping surfaces 27 of the end sections inwardly of the apices 29. However, when very sharp bends are made adjacent the ends of the pane it is desirable to provide means for more effectively retarding the softening of the narrow end portions of the panes adjacent the apices 29 of the end sections. FIGS. 18 to 21 of the drawings show a mold for making relatively sharp bends that is provided with means for effectively retarding the application of heat to the ends of the glass panes.

In FIGS. 18 to 21 a mold is shown which differs from the molds above described only in that the end and center sections B1 and C1 have glass shaping surfaces 27a and 28a of somewhat greater curvature and in that special means is provided for retarding the heating of the end portions of the glass panes.

The heat retarding means replaces the heat intercepting plates 32 of heat absorbing material in the end sections of the mold and comprises relatively thick heat absorbing plates 70 which fit within the outer end portions of the end sections B1 and which are supported on the cross braces 10. The plates 70 are relatively thick metal plates which may be cold rolled steel and retard the heating of the ends of the glass pane because of their great heat absorbing capacity and relatively high heat conductivity.

The sheet 31 of stainless steel forming a heat shield for the center section is a relatively thin sheet such as a 20 gauge sheet, whereas the heat absorbing plate 70 is relatively a thick plate, such as a one-quarter inch plate. The thickness and size of the plate 70 may, however, be varied to provide the desired retarding effect for various glass shapes and thicknesses. The plate 70 terminates short of the inner ends of the sections B1 and where there is considerable difference in the curvature of the shaping surfaces of the end sections that engage opposite side edge portions of the glass panes, the plate may have its inner edge 71 angularly disposed to provide a wider gap for passage of heat to the portions of the glass panes that are to be bent to a greater curvature.

In FIGS. 22, 23 and 24 a modified mold is shown in which the end sections B and center section C may be of the same construction as in the modifications previously described and connected by hinges 16a which are the same as the hinges 16 above described except that they are reversed with respect to the parting lines between the mold sections. Each hinge member 16a is secured in a recess 17a in a side strip 11 of the center section with its bottom 18 at the bottom of the recess and with the inner face of the bottom 18a flush with the end face 23a of the center section above the recess 17a. A rectangular plate 20a is welded in a recess in the adjoining end of a strip 9 and has an end face 22a that engages the bottom 18a to limit the pivotal movement. A pivot pin 24a extends through the arms of the hinge member 16 and the plate 20 and is offset outwardly with respect to the end faces 19a and 23a of the strips 9 and 11. By offsetting the pivot outwardly with respect to the parting line between the shaping surfaces of the mold sections, the inner ends 30a of the top faces of the strips 9 become the high points adjacent the hinges that remain above the ends of the top faces of the adjoining strips 11 during the movement of the mold sections from the glass receiving position to the molding position. The hinge arrangement shown in FIGS. 22 and 24 has been found to be preferable to that shown in FIGS. 3 and 6 in molds for forming deep bends in glass panes of large size and considerable weight since the inward movement of the points 30a during the bending operation permits more sagging of the central portion of the glass pane without slippage on the supporting points 30a.

The support for the mold shown in FIGS. 22 to 24 differs but slightly from the support shown in FIGS. 14 to 17. The supporting links 59a are so connected to the frame and to the end sections B of the mold that they engage with the posts 58 when the mold sections are in molding position and with stop flanges 65a when the mold sections are in glass receiving position. The supporting brackets 61a and the stop flanges 65a may be positioned to retain the links 59a in vertical position when the mold is in glass receiving position and in downwardly converging inclined positions when in molding position.

As above explained slght differences in the elevation of the shaping surface at the joints between the glass engaging strips of an end section and the glass engaging strips of the center section may be provided for by providing pivot brackets of different lengths on the end sections. As shown in FIG. 23 shortening of one of the brackets 63a causes one side of the mold to be somewhat lower than the other at the joint when the mold is in molding position, distances of the parting lines between the shaping surfaces of the sections from the pivot shaft 62a being such that the intermediate supporting points 30a are in the same horizontal plane when the mold is in glass receiving position.

In the practice of the invention a pair of panes of glass cut to final shape are accurately placed in superposed relation on each of the molds with the intermediate points 30 or 30a and the end points 29 of the shaping surface in engagement with the bottom pane closely adjacent its margin. The frames, with the molds carrying the glass panes, are then fed through a suitable lehr provided with accurately controlled temperature zones in which the glass panes are first heated to a temperature such that their rigidity is lessened to an extent such that the weight imposed on the inner ends of the end sections B of the mold is increased and an increased upward thrust is applied to the outer ends of the end sections B of the mold, causing rapid sagging of the glass panes and movement of the mold sections to molding position. During the sagging of the glass panes the four intermediate engaging points 30 or 30a of the shaping surface hold the panes in proper alinement with the shaping surfaces of the mold sections.

Since the parting lines between the mold sections are located in the zones of greatest curvature, the shortening of the mold in its movement from the glass receiving position to the molding position is substantially the same as the shortening of the glass panes due to sagging, so that sliding of the panes on the end supporting points 29 is very slight. The glass adjusts itself to the shaping surface as the mold moves into molding position and any slippage on the intermediate supporting portions 30 or 30a occurs during the final portion of the bending operation with very little marking of the glass. In fact, it is often difficult to find any mold marks whatever on the glass.

Where the bends in the ends of the panes are narrow and the outer ends of the end sections of the mold are disposed at a steep angle when in molding position, hold down devices such as the hold down devices D are desirable to insure good contact between the ends of the glass panes and the ends of the mold and for relatively sharp bends the provision of special heat retarding means such as the heat absorbing plates 70 is desirable.

It is to be understood that in accordance with the provisions of the patent statutes, variations and modifications of the specific devices herein shown and described may be made without departing from the spirit of the invention.

What I claim is:

1. A collapsible mold for forming curved glass panes by gravity bending thereof while heated having two substantially identical end sections mounted to swing vertically about parallel transverse horizontal axes intermediate their ends and at substantially equal distances from their inner ends and an elongated horizontally disposed center section supported at its ends on the inner ends of said end sections for vertical movement therewith, each end section having a marginal glass engaging member extending around its outer end and along its opposite sides, said center section having glass engaging members extending along its sides, said glass engaging members having end faces that abut at the ends of the center section and top faces that form a continuous concave glass shaping face when said sections are in molding position, pivots connecting said center section to said end sections, said pivots being below the top faces of said members and offset with respect to a line perpendicular to the glass shaping face at the parting line between the top faces of the glass engaging members whereby the top edges of the abutting ends of said glass engaging members move apart and one upwardly with respect to the adjoining end as the inner ends of the end sections and the center section move upwardly from molding position to provide a high point on said shaping surface at each of the four places where the ends of said glass engaging members adjoin, said axes and said pivots being so disposed with respect to said glass engaging members that the outer ends of said shaping face and the four intermediate high points thereof are movable to a glass supporting position where they are in horizontal alinement, whereby the glass is supported solely by end and intermediate portions of said glass shaping face during the bending operation.

2. A collapsible mold according to claim 1 in which the ends of the center section are connected to the end sections by pivots that are offset outwardly with respect to a line perpendicular to the glass shaping face at each parting line between the top faces of the glass engaging members whereby the inner ends of the shaping faces of the end sections are higher than the outer ends of the center section shaping faces during the movement of the sections from the glass receiving position to the glass molding position.

3. A collapsible mold according to claim 1 in which the ends of the center section are connected to the end sections by pivots that are offset inwardly with respect to a line perpendicular to the glass shaping face at each parting line between the top faces of the glass engaging members whereby the outer ends of the center section glass shaping faces are higher than the inner ends of the center section shaping faces during the movement of the sections from the glass receiving position to the glass molding position.

4. A collapsible mold according to claim 1 in which retaining members are mounted on the outer end of said end sections normally supported in positions spaced from the top face of a flat pane supported on the mold and in which means is provided for automatically moving said retaining members into engagement with the top face of the pane as said end sections approach their uppermost positions to hold the same in engagement with the outer ends of the end sections of the mold during the final portion of the movement of said end sections to their molding positions.

5. In apparatus for gravity bending of glass panes while heated, a mold having an end section that is mounted to swing vertically about a horizontal axis, that conforms to an end portion of a curved glass pane, that has an outer end provided with a face that engages with the under side of a glass pane to be bent and that moves upwardly during the bending operation, a glass retaining member mounted on the outer end of said section for movement toward and away from the glass engaging face of said section, a counterweighted lever mounted on said section, and means for connecting said lever to said member and for positioning the same to apply a thrust holding said member spaced away from the glass engaging face of said end section while said end section is in lowered position and to reverse the thrust of the lever to move said member toward said section to clamp the pane against said face as said section approaches its uppermost position.

6. In apparatus for gravity bending of glass panes while heated, a mold having an end section that is mounted to swing vertically about a horizontal axis that conforms to an end portion of a curved glass pane, that has an outer end provided with a face that engages with the under side of a glass pane to be bent and that moves upwardly during the bending operation, a glass retaining member mounted on the outer end of said section for movement toward and away from the glass engaging face of said section, a lever mounted on said section to swing vertically about a transverse axis intermediate its ends and extending above and below said axis, a counterweight connected to the lever below said axis, means connecting the upper end of the lever to said member to move the same toward or away from said glass engaging face, said counterweight being positioned at one side of said axis when said end section is in lowered position and exerting a thrust on said lever in a direction to move said retaining member away from said face and being movable by gravity across said axis as said section moves upwardly to reverse the thrust of the lever on said retaining member to move the same toward said face to press the pane toward said face as said section approaches its uppermost position.

7. In apparatus for gravity bending of glass panes while heated, a mold having an end section that is mounted to swing vertically about a horizontal axis that conforms to an end portion of a curved glass pane, that has an outer end with a face that engages with the under side of a glass pane to be bent and that moves upwardly during the bending operation, a glass retaining member, means for supporting said member on said end section for movement toward or away from a clamping position where it presses the end of the glass pane against said glass engaging face, and means controlled by movements of said end section for exerting a thrust on said retaining member to shift the same in a direction away from its pane clamping position when the outer end of said end section is in its lowermost position and for reversing the thrust on said retaining member to move the same into pane clamping position and to press the pane against said face as the outer end of said end section approaches its uppermost position.

References Cited in the file of this patent

UNITED STATES PATENTS

| | | |
|---|---|---|
| 1,999,558 | Black | Apr. 30, 1935 |
| 2,003,383 | Miller | June 4, 1935 |
| 2,330,349 | Galey | Sept. 28, 1943 |
| 2,348,278 | Boyles et al. | May 9, 1944 |
| 2,348,279 | Boyles et al. | May 9, 1944 |
| 2,450,297 | Pearse et al. | Sept. 28, 1948 |
| 2,452,488 | Paddock et al. | Oct. 26, 1948 |
| 2,518,951 | Smith | Aug. 15, 1950 |
| 2,608,799 | Babcock | Sept. 2, 1952 |
| 2,691,854 | Rugg | Oct. 19, 1954 |
| 2,695,476 | Jendrisak | Nov. 30, 1954 |
| 2,720,729 | Rugg | Oct. 18, 1955 |
| 2,736,140 | Black | Feb. 28, 1956 |
| 2,827,738 | McKelvey | Mar. 25, 1958 |
| 2,869,287 | Bamford | Jan. 20, 1959 |
| 2,876,595 | Golightly et al. | Mar. 10, 1959 |
| 2,897,632 | Fowler et al. | Aug. 4, 1959 |

FOREIGN PATENTS

| | | |
|---|---|---|
| 1,089,973 | France | Oct. 13, 1954 |
| 1,097,088 | France | Feb. 9, 1955 |
| 534,184 | Italy | Oct. 7, 1955 |